United States Patent [19]

Sage et al.

[11] 4,178,412

[45] Dec. 11, 1979

[54] GLASS SIZE COMPOSITIONS AND GLASS FIBERS COATED THEREWITH

[75] Inventors: Donald B. Sage, Granville; Fred G. Krautz, Newark, both of Ohio

[73] Assignee: Owens-Corning Fiberglas Corporation, Toledo, Ohio

[21] Appl. No.: 895,883

[22] Filed: Apr. 13, 1978

Related U.S. Application Data

[63] Continuation-in-part of Ser. No. 752,222, Nov. 20, 1976, abandoned.

[51] Int. Cl.$^2$ .......................... B32B 9/00; D02G 3/00
[52] U.S. Cl. ............................ 428/391; 260/29.6 R; 525/209; 428/392
[58] Field of Search ............... 428/375, 378, 391, 392; 260/824 R, 827, 29.6 R; 526/279; 65/3 C

[56] References Cited

U.S. PATENT DOCUMENTS

| | | | |
|---|---|---|---|
| 3,252,825 | 5/1966 | Marzocchi et al. | 260/827 |
| 3,418,094 | 12/1968 | Marsden | 65/3 |
| 3,674,891 | 7/1972 | Wheeler | 260/827 |
| 3,729,438 | 4/1973 | Plesich et al. | 526/279 X |
| 3,884,886 | 5/1975 | Plueddeman | 260/827 X |
| 3,928,684 | 12/1975 | Buning et al. | 428/391 X |
| 4,097,436 | 6/1978 | Buning et al. | 260/29.6 R X |
| 4,120,837 | 10/1978 | Schafer et al. | 260/824 R |

*Primary Examiner*—Lorraine T. Kendell
*Attorney, Agent, or Firm*—Ronald C. Hudgens; Philip R. Cloutier; James B. Wilkens

[57] ABSTRACT

A size composition for glass fibers, and glass fibers coated therewith, is disclosed. The size comprises an unsaturated, water-emulsifiable polyester resin, an ethylene-vinyl acetate copolymer emulsion and a polyvinyl acetate-organo silane copolymer, the size being suitable for application to fiberglass roving employed to reinforce sheet and bulk molding compounds.

8 Claims, No Drawings

GLASS SIZE COMPOSITIONS AND GLASS FIBERS COATED THEREWITH

This is a continuation-in-part of our co-pending application Ser. No. 752,222 filed Nov. 20, 1976, now abandoned.

This invention relates to a size composition and to glass fibers at least partially coated therewith which are useful for incorporation in molding of compositions for strength improvement.

The use of molding compounds, both sheet and bulk, is well known. Generally such molding compounds comprise a thermosetting resin such as a polyester and various fillers and reinforcements in combination with a crosslinking monomer. The molding composition is pliable and is subjected to molding pressures under elevated temperatures. Under these conditions, crosslinking of the resin occurs and a thermoset composition is produced.

It is customary to incorporate into the molding compounds various fillers and reinforcements which provide bulk and strength. Principal among such reinforcements are glass fibers which generally have diameters of about 0.00025 to 0.00075 inch and lengths of about 0.13 to about 2.00 inch. In order to facilitate the handling of the glass fibers, it is customary that they be sized immediately upon forming. It is advantageous if the size composition serves not only to facilitate the handling of the glass fibers but also if the size acts to create a bond between the glass fibers and the resin such that the strength properties of the molded resin are improved. The glass size composition of this invention possesses such properties.

According to this invention, there is provided a glass size composition which comprises an unsaturated, water-emulsifiable polyester resin, an emulsion of the copolymer of ethylene and vinyl acetate and the copolymer of polyvinyl acetate and an organo-silane.

Also according to this invention, there are provided glass fibers, at least a portion of the surface of which is sized with the size of this invention.

This invention also provides a molding composition containing glass fibers sized with the size of this invention.

In the size composition of this invention, any suitable unsaturated, water-emulsifiable polyester resin can be employed. One particularly suitable unsaturated, water-emulsifiable polyester resin is orthophthalic polyester resin, designated E-400, as commercially available from Owens-Corning Fiberglas. Another suitable unsaturated, water-emulsifiable polyester resin is designated E-108 as commercially available from Owens-Corning Fiberglas. E-108 is neopentyl glycol polyester resin.

The unsaturated, water-emulsifiable polyester resin will be employed in the size in an amount within the range of from about 1 to about 13 weight percent of the aqueous size.

Any suitable ethylene vinyl acetate emulsion can be used. The term "ethylene vinyl acetate emulsion", as used herein and as is well known to those skilled in the art, denotes an aqueous emulsion of the copolymer of ethylene and of vinyl acetate.

One particularly suitable ethylene vinyl acetate emulsion is Airflex 400 as commercially available from Air Products and Chemicals. Airflex 400 is an ethylene vinyl acetate copolymer having a solids content of 55-57%, a viscosity, as measured on a Brookfield Viscometer, Model LVF, at 60 rmp and 77° F., of 1100 to 1600 cps. and a pH of from 5.0 to 6.5. Other suitable ethylene vinyl acetate emulsions are commercially available as Airflex 410 and Airflex 510 from Air Products and Chemicals.

The vinyl acetate-ethylene copolymer emulsion will be employed in the size in an amount within the range of from about 1 to about 10 weight percent.

Any suitable polyvinyl acetate-organo silane copolymer having a high insolubility in styrene and a silane level of from about 1 to about 7 weight percent can be used.

One particularly suitable polyvinyl acetate-organo silane copolymer is National Starch 78-3724 as commercially available from National Starch and Chemical Corporation. National Starch 78-3724 is a copolymer of vinyl acetate and gamma-methacryloxy propyltrimethoxysilane (A-174 Union Carbide) and has about a 2 percent silane level.

The polyvinyl acetate-organo silane copolymer will be employed in the size in an amount within the range of from about 1 to about 15 weight percent.

The glass size composition of this invention will also comprise at least one lubricant and at least one coupling agent.

Any suitable lubricant can be employed. A preferred lubricant is the cationic condensation product of dimethylaminopropylamine and pelargonic acid. This material will have a specific gravity of about 1, a viscosity of about 500 cps. at 25° C. and a pH (5% aqueous solution) of from about 5.5 to about 7. A preferred lubricant of those characteristics is available from Emery Industries as Emerstat 6664. Another suitable lubricant is an amide substituted polyethyleneamine, such as Emery 6717 available from Emery Industries.

The lubricant is employed in the size in an amount within the range of from about 0.02 to about 1.0 weight percent.

Any suitable coupling agent comprising an organo-silane can be employed. Preferably, an organo-silane such as gamma-methacryloxypropyltrimethoxysilane will be used. A suitable coupling agent of this type is available as A-174 from Union Carbide. Other suitable coupling agents are vinyl-tris (2 methoxyethoxy) silane available as A-172 from Union Carbide and gamma-animopropyltriethyoxysilane available as A-1100 from Union Carbide.

The coupling agent is employed in the size in an amount within the range of from about 0.01 to about 1.0 weight percent. The glass size composition of this invention can also comprise up to 0.05 weight percent of an acid suitable to adjust the pH of the size composition to enable silane hydrolysis prior to the addition of the silane coupling agent. A suitable acid is glacial acetic acid.

The size of this invention is prepared by conventional methods such as that described below. It can be applied to any glass fibers conventionally employed as molding compound reinforcement, being applied during the forming operation such that the fibers possess, upon drying, a solids content within the range of from about 1.2 to about 3.0 weight percent, based upon loss on ignition.

The best mode for carrying out the invention is demonstrated by the following examples.

EXAMPLE I

This example demonstrates the preparation of approximately 100 gallons of a size composition of this invention.

About 39 pounds of orthophthalic polyester resin (OCF E-400) were mixed with about 20 gallons of demineralized water in a first premix kettle for a period of about 4 hours. The resulting solution was introduced into a main mix tank containing about 20 gallons of demineralized water.

About 75 pounds of polyvinyl acetate-organo silane copolymer (National Starch 78-3724) were introduced into a second premix kettle and about 10 gallons of demineralized water were added thereto. The composite was mixed for about 5 minutes and the resulting mixture was introduced into the contents of the main mix tank.

About 25 pounds of ethylene vinyl acetate (Airflex 400) and about 5 gallons of demineralized water were added to a third premix tank. The composite was mixed for about 5 minutes and the resulting mixture was introduced into the contents of the main mix tank.

About 10 gallons of demineralized water were added to a fourth premix tank and about 0.25 pound of glacial acetic acid added thereto. Mixing was started and about 3.5 pounds of gamma- methacryloxypropyltrimethoxysilane (A-174) were added at the rate of about one pound per every 30 seconds. Mixing was continued for about 25 minutes and the resulting mixture was introduced into the contents of the main mix tank.

About 2 gallons of demineralized water were added to a fifth premix tank and heated to about 155° F. About 36 milliliters of glacial acetic acid were added to the water and then about 0.8 pound of lubricant (Emery 6717). The composite was mixed for about 10 minutes and the resulting mixture was introduced into the contents of the main mix tank.

The contents of the main mix tank, after complete mixing and the addition of sufficient water to bring the volume of the size to about 100 gallons, will have a solids content within the range of from about 8 to about 12 weight percent and a pH within the range of from about 4 to 6.

The size prepared in the above manner was applied to individual glass fibers by conventional application methods and at rates such that the strand solids, on drying, amounted to about 2 weight percent. Preferably, the size is supplied to the applicator at a temperature of about 60° F.

EXAMPLE II

Glass fibers having a diameter within the range of from about 0.00025 to about 0.00075 inch, sized on forming with the size of this invention, were incorporated in a sheet molding compound of the following approximate composition.

| Composition | Weight Percent |
| --- | --- |
| Polyester Resin Syrup | 34 |
| Glass fibers (1 inch length) | 30 |
| Calcium Carbonate | 34 |
| Zinc Stearate | 0.9 |

-continued

| Composition | Weight Percent |
| --- | --- |
| Magnesium Hydroxide | 1 |
| Catalyst | 0.1 |

A series of such blends was prepared, each blend containing glass fibers sized with a size composition of this invention and compared with a similar series of blends containing glass sized with a prior art size. Average strength test results on each series of blends, molded at about 1000 psi at a platen temperature within the range of from about 270° F. to about 300° F. with a cure cycle of up to about 1.5 to about 4 minutes, were as follows: d

| | Glass Size Formulations | |
| --- | --- | --- |
| | Invention | Prior Art |
| Tensile Strength, M psi | 12.78–14.03 | 12.32–12.52 |
| Impact Strength, ft. pounds | 16.66–18.03 | 13.90–17.69 |
| Flexural Strength, M psi | 28.61–31.38 | 28.06–30.43 |

It will be seen from the above data that glass sized with the size of the present invention acts to increase the mechanical strength of the sheet molding compounds into which the glass is incorporated to a greater extent than does glass sized with the prior art sizing.

It will be evident from the foregoing that various modifications can be made to the present invention. Such, however, are considered as being within the scope of the invention.

What is claimed is:

1. A glass fiber having a portion of its surface coated with about 1.2 to 3.0 weight percent of a sizing composition, said sizing composition comprising:
   (a) an unsaturated water-emulsifiable polyester resin;
   (b) an emulsion of a copolymer of ethylene and vinyl acetate; and
   (c) a copolymer of polyvinylacetate and an organo silane having about 1 to 7 weight percent of said organo silane.

2. The glass fiber of claim 1 in which said polyester resin is orthophthalic polyester resin.

3. The glass fiber of claim 1 in which said polyester resin is employed in said aqueous composition in an amount within the range of from about 1 to about 13 weight percent.

4. The glass fiber of claim 1 in which said ethylenevinyl acetate polymer emulsion is employed in said aqueous composition in an amount within the range of from about 1 to about 10 weight percent.

5. The glass fiber of claim 1 in which said polyvinyl acetate-organo silane copolymer is employed in said aqueous composition in an amount within the range of from about 1 to about 15 weight percent.

6. The glass fiber of claim 5 in which said polyvinyl acetate-organo silane copolymer comprises a copolymer of vinyl acetate and gamma-methacryloxypropyltrimethoxysilane.

7. The glass fiber of claim 1 wherein said aqueous composition further comprises a lubricant and an organo silane coupling agent.

8. The glass fiber of claim 7 wherein said aqueous composition contains about 0.02 to 1.0 weight percent of said lubricant and about 0.01 to 1.0 weight percent of said coupling agent.

* * * * *